United States Patent
Gingras et al.

(10) Patent No.: US 9,605,379 B2
(45) Date of Patent: Mar. 28, 2017

(54) CAST REFINER PLATE SEGMENT WITH BLUNT EDGES AND CORNERS FOR SAFE HANDLING

(71) Applicant: Andritz Inc., Glens Falls, NY (US)

(72) Inventors: Luc Gingras, Harrogate (GB); Yves Raymond, Milton, PA (US)

(73) Assignee: Andritz Inc., Glens Falls, NY (US)

( * ) Notice: Subject to any disclaimer, the term of this patent is extended or adjusted under 35 U.S.C. 154(b) by 448 days.

(21) Appl. No.: 14/169,707

(22) Filed: Jan. 31, 2014

(65) Prior Publication Data

US 2014/0217223 A1    Aug. 7, 2014

Related U.S. Application Data

(60) Provisional application No. 61/759,579, filed on Feb. 1, 2013.

(51) Int. Cl.
| | |
|---|---|
| B02C 7/12 | (2006.01) |
| D21D 1/30 | (2006.01) |
| B23P 15/28 | (2006.01) |
| D21D 1/00 | (2006.01) |

(52) U.S. Cl.
CPC ............ *D21D 1/306* (2013.01); *B02C 7/12* (2013.01); *B23P 15/28* (2013.01); *D21D 1/008* (2013.01); *Y10T 29/49989* (2015.01)

(58) Field of Classification Search
CPC .................................. B02C 7/12; B02C 7/13
USPC ........................ 241/296–298, 261.2–261.3
See application file for complete search history.

(56) References Cited

U.S. PATENT DOCUMENTS

| | | | | |
|---|---|---|---|---|
| 5,251,682 A | * | 10/1993 | Cline ..................... | B22D 25/02 164/137 |
| 2002/0185560 A1 | | 12/2002 | Johansson | |
| 2006/0006264 A1 | * | 1/2006 | Sabourin ................. | B02C 7/12 241/261.2 |

* cited by examiner

*Primary Examiner* — Mark Rosenbaum
(74) *Attorney, Agent, or Firm* — Kerri A. Hochgesang; Robert Joseph Hornung

(57) ABSTRACT

A cast metal plate segment for a refiner of lignocellulosic material or a disperser of comminuted paper or packaging products, the plate segment including a front side with a front surface configured to refine the lignocellulosic material or disperge the comminuted paper or packaging products, and a back side, opposite to the front side, including a corner or edge, wherein the corner or edge comprises a casted surface between machined planar surfaces adjacent the corner or edge.

9 Claims, 3 Drawing Sheets

CAST REFINER PLATE SEGMENT WITH BLUNT EDGES AND CORNERS FOR SAFE HANDLING

RELATED APPLICATION

This application claims priority and incorporates by reference U.S. provisional application Ser. No. 61/759,579 filed Feb. 1, 2013.

TECHNICAL FIELD

This disclosure relates to mechanical refiners for pulping wood chips and other comminuted lignocellulosic materials. The application specifically relates to refiner plates used in mechanical refiners.

BACKGROUND OF THE INVENTION

Mechanical refiners are employed in the production of pulp material from lignocellulosic material to be used in the making of paper or other paper-based packaging material. Mechanical refiners can also be used to produce pulp from recycled paper material. Mechanical refiners that process recycled material are typically referred to as dispergers or dispersers.

Mechanical refiners may use a flat refining surface, a conical refining surface or a combination of flat and conical refining surfaces. Mechanical refiners may comprise two sets of flat discs, a rotating disc, commonly known as a "rotor," and a stationary disc, commonly known as a "stator." Some mechanical refiners may use two rotating discs or the mechanical refiners may use conical-shaped discs configured in either of the previously described manners. Refiner plates are mounted onto discs, which in turn are mounted in the refiner. A gap exists between the discs through which feed material may move. Feed material may comprise wood chips or other cellulosic material. The refining action occurs as feed material passes generally outwardly through the gaps between the opposing relatively rotating discs.

In a mechanical refiner, the feed material is generally acted upon as it moves along the surfaces of the refiner plates thereby allowing for separating and cutting of the material. The refining plate surfaces of the opposing discs in a refiner are typically a combination of bars and grooves facing one-another and crossing each other as at least one of the discs moves, or by a series of intermeshing teeth which cross one-another thereby applying compression and shear forces to the material to be refined. The refiner plates are generally mounted to discs and provide the opposing surfaces for refining. The feed material generally moves through the gap formed between the opposing surfaces of the plates.

Conventional mechanical refiners are generally capable of handling high, medium, or low consistency feed material, whereas conventional dispersers are generally capable of handling recycled feed material. Refiner plates, for a conventional mechanical refiner or a disperser are a critical component of the refining or dispersing equipment and must be capable of handling the feed material (high, medium, or low consistency feed material or recycled or recovered comminuted paper or packaging material used as feed material). The geometries of surfaces of the refiner plates mounted on the discs, such as bars and grooves or intermeshing teeth, typically determine the quality of the work applied to the feed material to be refined.

As feed material moves across the surface of the refiner plates, the surface of the refiner plates tend to wear down and become less effective in providing the desired refining or dispersing action. The wearing of the refiner plates encourages regular changing of the refiner plates to maintain the refining or dispersing performance over time. A typical circle of refiner or disperser plates comprises between 3 and 24 equally-sized segments, which together form a circle.

Mechanical refiners, including dispersers, typically have refiner plates mounted to the discs. These refiner plates are typically made in segments. These segments are generally annularly truncated wedges, such as pie-shaped wedges, but the segments could be other shapes. A series of segments may be mounted adjacent to one another on the disc to form a complete refiner plate.

The "refiner plate segments," which can describe both mechanical refiner plate segments and disperser refiner plate segments, are usually made of stainless steel or white iron castings machined to fit together as a set in the refiner. The materials used for these segments are relatively hard alloys and the castings require precision machining of all surfaces. This precision machining results in very sharp edges and corners, posing a safety concern to those handling the segments.

Over the years, persons handling the segments have received numerous injuries. While these edges and corners can be buffed by hand to reduce the hazard, hand buffing is time-consuming and costly. There is a long felt need for a less costly, safer machined plate segment.

BRIEF DESCRIPTION OF THE INVENTION

A mechanical refiner plate segment has been conceived that reduces the hazards of sharp edges on the segment. The locations for reducing sharp edges on the refiner plate segments may be at the junction, e.g., edges and corners, of machined surfaces on the plate segment. For example, machined surfaces typically meet at the four corners on a refiner plate segment, and at the edges of the ribs on the back side of the refiner plate segment. At these junctions of machined surfaces, the precision machining of the metal can result in sharp edges and corners.

To overcome the hazard of the sharp edges and corners on plate segments, blunt surfaces at the junctions may be added directly to the casting mold. These blunt surfaces may be chamfers added to the casting mold at portions of the casting mold that would otherwise form an edge or a corner between machined metal surfaces on the refiner plate. In alternative embodiments, these blunt surfaces at the junctions may be rounded sections added to the casting molds at portions of the casting mold that would otherwise form an edge or a corner between machined metal surfaces on the refiner plate.

The cast blunt surfaces added directly to the casting mold are wider than the blunt surfaces on the refining plate remaining after machining the surfaces of the refiner plate. The casting mold generally contains a positive mold of the refiner plate segment. Sand or other such suitable material is generally then poured into the mold and sealed to create a negative mold of the refiner plate segment. Molten metal is then generally poured into the sand mold to form a cast refiner plate segment. The blunt surfaces can form cast blunt surfaces on the junctions of the corresponding refiner plate segments that are wider than the these blunt surfaces after they are machined. The cast blunt surfaces at the junctions may be a cast chamfer surface or a cast rounded surface depending on the type of blunt surface used in the mold. In an exemplary embodiment, the cast blunt surfaces at the junctions are created by the casting of the refiner plate segment and not by machining of the refiner plate segment.

In an exemplary embodiment, a refiner plate segment for the production of pulp by refining lignocellulosic material has been conceived comprising a front side having a surface configured to refine the lignocellulosic material; and a back side having a cast blunt surface at a junction between a first cast surface and a second cast surface on the back side, wherein the first cast surface is substantially perpendicular to the second cast surface.

The use of blunt surfaces at the junctions in the casting mold thereby creates a refiner plate segment which can be handled more safely without the high manufacturing costs associated with hand polishing of the refiner plate segments.

When surfaces are machined on a cast plate segment, the cast blunt surfaces are generally longer than the depth of grind stock machined away from adjacent surfaces. That is, when portions of the refiner plate segment are machined during the precision machining step, the cast blunt surfaces are not completely machined away. This length prevents the machined surfaces on the plate segment from directly contacting other machined surfaces at outer junctions of the plate segment. These outer junctions can be perimeter junctions on the back side of the refiner plate surface, perimeter junctions on the front refiner plate surface, and body junctions on the back side of the refiner plate which are not perimeter junctions; the outer junctions are more likely to be directly handled by operators.

In one exemplary embodiment, one (1) millimeter (mm) of grind stock is ground from the outer surfaces of the cast refiner plate segment. Machining the outer surfaces removes metal and thereby reduces the certain dimensions of the surfaces, such as their height or width. The machined surfaces generally include surfaces parallel to a rotational axis of the refiner plate segment and surfaces perpendicular to the axis. The junction, e.g., edge, between a parallel and perpendicular surface tends to become very sharp as both surfaces are machined. Casting a blunt surface, such as a chamfer, at one or more of the junctions between these parallel and perpendicular surfaces is effective to avoid sharp edged junctions being formed due to machining. However, if the cast blunt surfaces are too small, they will be entirely removed by machining and will not prevent the formation of sharp edges by machining. The blunt surfaces should be sufficiently wide so that they are not eliminated by machining of the parallel and perpendicular surfaces. By having an unground, i.e., not yet machined, cast blunt surface at a junction that is about 1 mm greater than the depth of the machined surfaces desired to be ground, the final machined parallel and perpendicular surfaces will generally not contact each other to form a sharp edge.

The blunt surfaces at the junctions on the casting mold would generally not be applied to sections of the casting mold that can be used to form the front refiner plate surface. The front refiner plate surface has a working function to manipulate (cut, separate, etc.) the material sent to the mechanical refiner. For example, in some refining applications, if the working surface of the refiner plate segment were cast so that cast blunt surfaces formed at the edges of the refining bars and grooves, the result would likely negatively affect the performance of the working surface of the refiner plate segments.

All or only some of the junctions between surfaces to be machined could have cast blunt surfaces, including those on the interior back side of the refiner plate segment. For example, the blunt surfaces applied to the junctions at the outer perimeter of the refiner plate segment are particularly useful to reduce sharp edges on the plate segment that could cut or otherwise harm persons handling the plate segment.

In exemplary embodiments, this cast blunt surface can be on the outer junctions of the back side of the refiner plate segments and on the perimeter junctions of the front refiner plate surface. In other exemplary embodiments, the cast blunt surfaces can be on the outer junctions of the back side of the refiner plate segments, and the first and second cast surfaces may be surfaces of a rib on the back side of the refiner plate segment. In yet another exemplary embodiment, the cast blunt surfaces can be on the outer junctions on the back side of the refiner plate, the perimeter junctions of the back side of the refiner plate segment and on the perimeter junctions of the front refiner plate surface. In yet another exemplary embodiment, not all outer junctions on the back side of the refiner plate segments may have cast blunt surfaces. While some embodiments may have cast blunt surfaces at all junctions where machined metal would otherwise directly contact machined metal, it is generally desirable to have cast blunt surfaces on the outer junctions on the back side of the refiner plate segment.

In exemplary embodiments, the cast blunt surfaces may be on the outer junctions. In other embodiments, the cast blunt surfaces may be on a body junction, and the first cast surface is at the perimeter of the plate segment. In yet other embodiments, the cast blunt surfaces may be on body junctions and the first and second cast surfaces may be surfaces of a rib on the back side of the refiner plate segment. In still other embodiments, the cast blunt surfaces may be on perimeter ribs of the refiner plate segment and the first and second cast surfaces may be surfaces of the perimeter rib.

In embodiments where the cast blunt surface is a cast chamfer surface, the cast chamfer surface may be at an angle of 105 degrees to 165 degrees, desirably 120 degrees to 150 degrees, relative to the machined horizontal surface of the edge.

In exemplary embodiments where the cast blunt surface is a cast rounded surface, the cast rounded surface may have a radius prior to grinding of 2.5 mm to 15 mm, desirably 3 mm to 5 mm. This cast rounded surface can be added to prevent the sharp junction formed by precision machining the cast refiner plate segment and can be achieved at locations where multiple surfaces are machined, or a single surface is machined, thereby leaving a safer cast blunt surface on outer junctions on the back side of the refiner plate segment.

In another exemplary embodiment, the cast blunt surfaces may be a combination of cast chamfer surfaces and cast rounded surfaces. A refiner plate segment has been conceived for the production of pulp by refining lignocellulosic material, the plate segment comprises a front refiner plate surface configured to refine the lignocellulosic material, and a back side having cast blunt surfaces. The cast blunt surfaces may be cast chamfer surfaces. In another exemplary embodiment, the cast blunt surfaces may be cast rounded surfaces. The front refiner plate surface may comprise a combination of bars and grooves, a series of teeth, or features configured to apply compression and shear forces to the material to be refined.

In another exemplary embodiment, a disperser plate segment has been conceived for removing contaminants from recycled or recovered comminuted paper or packaging material comprising a front refiner plate surface configured to act on the comminuted material, and a back side having cast blunt surfaces. The cast blunt surfaces may be chamfered or rounded.

A method has been conceived to form a plate segment for a refiner or disperser comprising casting a metal plate segment, wherein the cast metal plate segment has a diagonal cast surface between a cast top surface and a cast side surface, machining the cast top surface to form a machined top surface, machining the cast side surface to form a machined side surface, wherein at least a portion of the diagonal cast surface remains separating the machined top surface and the machined side surface.

In the method, the machined top surface may be orthogonal to the machined side. The machining of the machined top surface and the machined side surface may remove about 1 mm in depth of cast material from the cast top surface. In exemplary embodiments, the cast blunt surface may have a radius of at least 1.5 times to 2.5 times a depth of cast material removed during the machining of the cast top surface and the cast side surface.

The method may further comprise pouring molten metal into a casting mold, wherein the casting mold has blunt surfaces at junctions complementary to outer junctions and body junctions on a refiner plate segment.

Another exemplary embodiment of a casted metal plate segment for a refiner of lignocellulosic material or a disperser of comminuted paper or packaging products has been conceived, the plate segment comprising a front refining surface including a front surface configured to refine the lignocellulosic material or disperse the comminuted paper or packaging products, and a back side, opposite to the front side, including an corner or edge, wherein the corner or edge comprises a casted surface between machined planar surfaces adjacent the corner or edge.

A casting mold for a refiner plate segment configured to the manufacture of pulp from lignocellulosic material has been conceived comprising blunt surfaces integrated at junctions complementary to outer junctions and body junctions on a refiner plate segment, wherein the blunt surfaces in the casting mold are wider than a to be machined top surface and a machined side surface on the refiner plate segment to be formed from the casting mold.

In exemplary embodiments of the casting mold for the refiner plate segment, the blunt surfaces may be rounded surfaces, and these rounded surfaces may have a radius of at least 1.5 times to 2.5 times a depth of cast material removed during the machining of the cast top surface and cast side surface.

In other exemplary embodiments of the casting mold for the refiner plate segment, the blunt surfaces may be chamfer surfaces, and these chamfer surfaces may have a length of at least 1.5 times to 2.5 times a depth of cast material removed during the machining of the cast top surface and cast side surface.

DETAILED DESCRIPTION OF THE INVENTION

Figure 1:
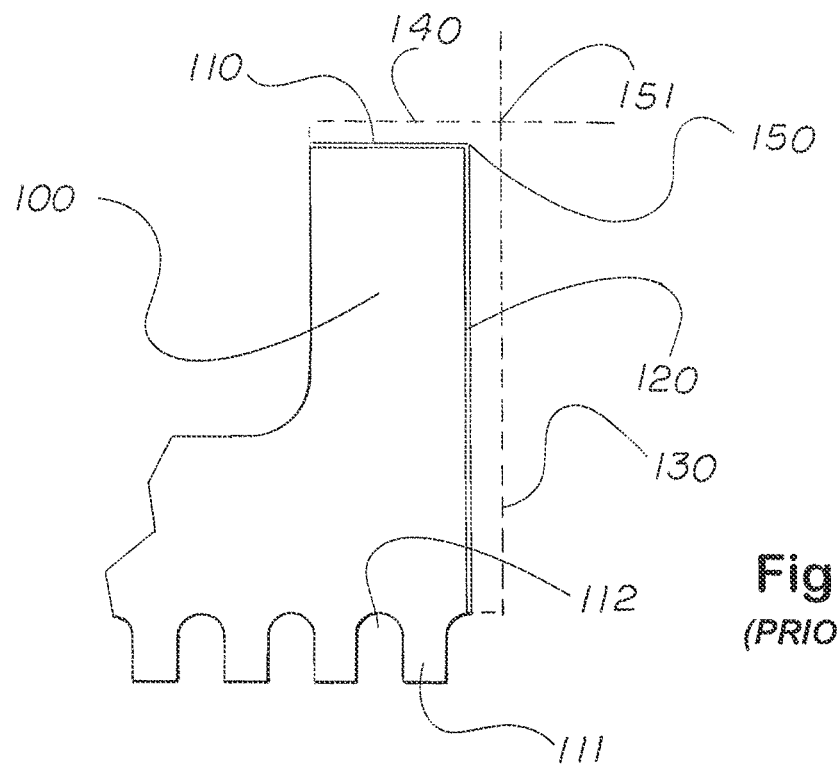
FIG. 1 shows a conventional large rib with flat machined surfaces of a refiner plate segment.

The foregoing will be apparent from the following more particular description of example embodiments of the disclosure, as illustrated in the accompanying drawings in which like reference characters refer to the same parts throughout the different views. The drawings are not necessarily to scale, with emphasis instead being placed upon illustrating embodiments of the disclosed device.

It is desirable to provide a refiner or disperser plate segment with cast blunt surfaces, especially the back side of the refiner plate segment, to reduce the hazardous sharp edges and corners created when the cast refiner plate segment is precision machined.

FIG. 1 shows a rib 100 with flat machined surfaces, as currently produced when the cast refiner plate segment is precision machined. The rib 100 has bars 111 and grooves 112 at the bottom. These bars 111 and grooves 112 are found on the working surface of the refiner plate segment. In current refiner plate segments, the underside of the segment may have sharp, square edges and corners, wherein the edges and corners are collectively referred to as junctions. The cast top surface 140 (shown by the dotted lines) and the cast side surface 130 (shown by the dotted lines) intersect to form the cast sharp, square edge 151.

Once cast, the refiner plate segment can be precision machined. During machining, approximately 1 mm of material is ground from the cast surfaces to produce flat metal surfaces, such as a machined top surface 110 and machined side surface 120. The junctions between intersecting metal surfaces form sharp machined metal-to-metal junctions. Junction 150 is an example of a sharp edged junction formed by the intersection of machined top surface 110 and machined edge surface 120. These sharp machined metal-to-metal junctions 150 have been and continue to be the source of injuries to personnel handling the refiner plate segments.

Figures 2, 3:
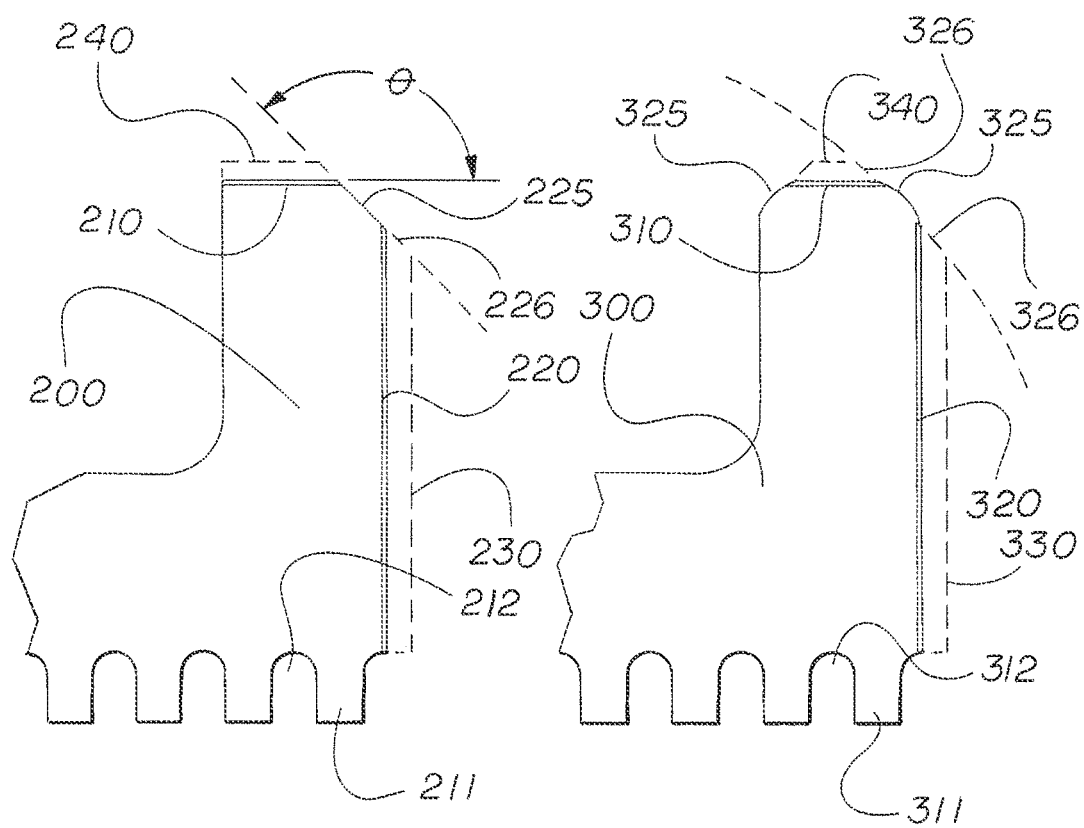
FIG. 2 shows an exemplary large rib with a chamfer surface of a novel refiner plate segment.
FIG. 3 shows an exemplary large rib with a rounded surface of a refiner plate segment.

FIG. 2 shows an exemplary embodiment where the cast blunt surface is a cast chamfer surface 225. A rib 200 is depicted with a cast chamfer surface 225 along the edge of the rib 200. The rib 200 has bars 211 and grooves 212 at the bottom. As with the bars 111 and grooves 112 of FIG. 1, these bars 211 and grooves 212 can be found on the working surface of the refiner plate segment. The cast top surface 240 (shown by the dotted lines), the cast side surface 230 (shown by the dotted lines) and a diagonal cast surface 226 (shown by dotted lines) intersect. The diagonal cast surface 226 may be sized to be large enough so the precision machining of the cast refiner plate segment results in a cast chamfer surface 225 forming an angle θ with the horizontal cast top surface 240, the angle θ being between 105 degrees and 165 degrees, desirably 120 degrees to 150 degrees.

Once cast, the refiner plate segment may be precision machined. Approximately 1 mm of material can be ground from the cast top surface 240 and the cast side surface 230, to produce a machined top surface 210 and a machined side surface 220. The diagonal cast surface 226 is large enough not to be fully removed by machining the cast top surface 240 and cast side surface 230. After machining, a portion of the diagonal cast surface that remains. The remaining portion of the diagonal cast surface is the cast chamfer surface 225. The cast chamfer surface 225 is between the machined top surface 210 and machined side surface 220. Because of the cast chamfer surface 225, the precision machining of the machined top surface 210 and machined side surface 203 does not form sharp edges and corners. The cast chamfer surface 225 generally does not cut the hands of persons handling the plate segments.

The precision machining of the rib 200 can be accomplished to allow multiple cast chamfer surfaces 225. For example, cast chamfer surfaces may be machined on each side of the rib 200. In an alternative embodiment, only one cast chamfer surface 225 may be produced on one side of the rib 200.

FIG. 3 shows an exemplary embodiment in which the cast blunt surface is a cast rounded surface. This figure depicts a rib 300 with a cast rounded surface 325 along the rib 300. The rib 300 has bars 311 and grooves 312 at the bottom. As with the bars 111 and grooves 112 of FIG. 1, these bars 311 and grooves 312 can be found on the working surface of the refiner plate segment. The cast top surface 340 (shown by the dotted lines), the cast side surface 330 (shown by the dotted lines), and a rounded cast surface 326 (shown by dotted lines) intersect. The rounded cast surface 326 is sized to have a radius of curvature sufficiently long to ensure that the machining of the cast top surface 340 and the cast side surface 330 do not fully remove the rounded cast surface 326. The portion of the rounded cast surface 326 that remains after machining is the cast rounded surface 325.

During precision machining, approximately 1 mm of material is ground from the cast top surface 340 to produce the machined top surface 310 and approximately 1 mm of material can be removed from the cast side surface 330 to produce the machined side surface 320. Because the cast rounded surface 325 is not fully removed by the precision machining, sharp edges and corners are generally not formed by the intersection of the machined top surface 310 and the machined side surface 320.

The precision machining of the rib 300 can be accomplished to allow multiple cast rounded surfaces 325 (on each side of the large rib 300) as shown. In another exemplary embodiment, only one cast rounded surface 325 may be produced.

Figures 4, 4A:
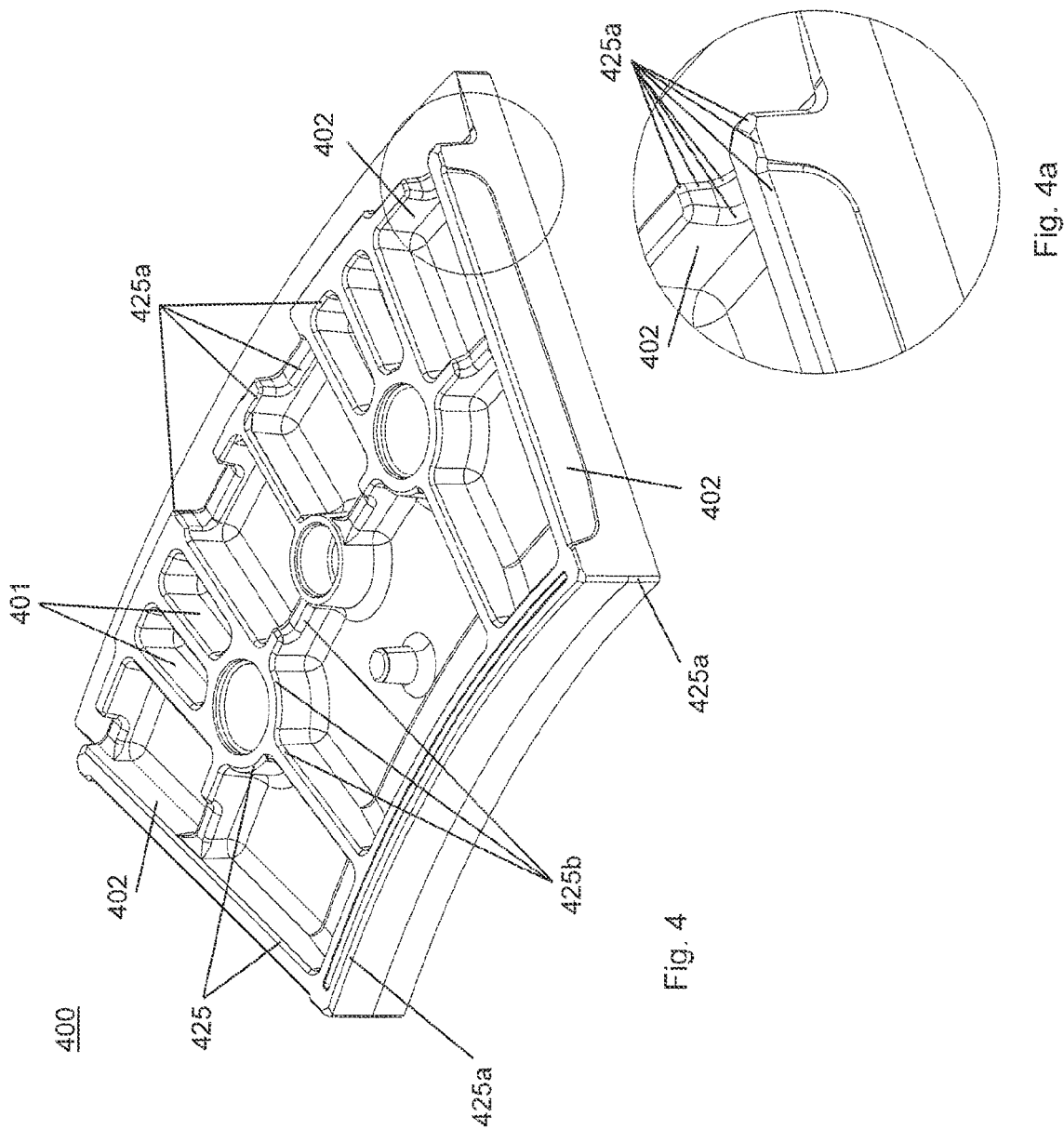
FIG. 4 shows an exemplary back side of a refiner plate segment with chamfer surfaces used throughout the back side of the refiner plate segment.
FIG. 4a shows the detail in the circle shown in FIG. 4 of an exemplary refiner plate segment back side where casted chamfer surfaces are used on the junctions on the back side of the refiner segment.

FIG. 4 shows the back side of an exemplary refiner plate segment 400 with cast chamfer surfaces 425 used throughout the back side of the refiner plate segment 400. Cast chamfer surfaces 425 can be used on the outer junctions 425a and body junctions 425b of the refiner plate segment back side. Although this exemplary embodiment depicts chamfer surfaces 425 used throughout most ribs 401 on the back side of the refiner plate segment 400, in other embodiments chamfer surfaces 425 may be used mostly on select ribs 401 such as the perimeter ribs 402.

FIG. 4a shows the detail x of FIG. 4. FIG. 4a depicts the back side of an exemplary refiner plate segment 400. In exemplary embodiments, the cast chamfer surfaces 425 can be between machined surfaces (see 210 and 220 of FIG. 2) that are substantially orthogonal to machined surfaces.

Figure 5:
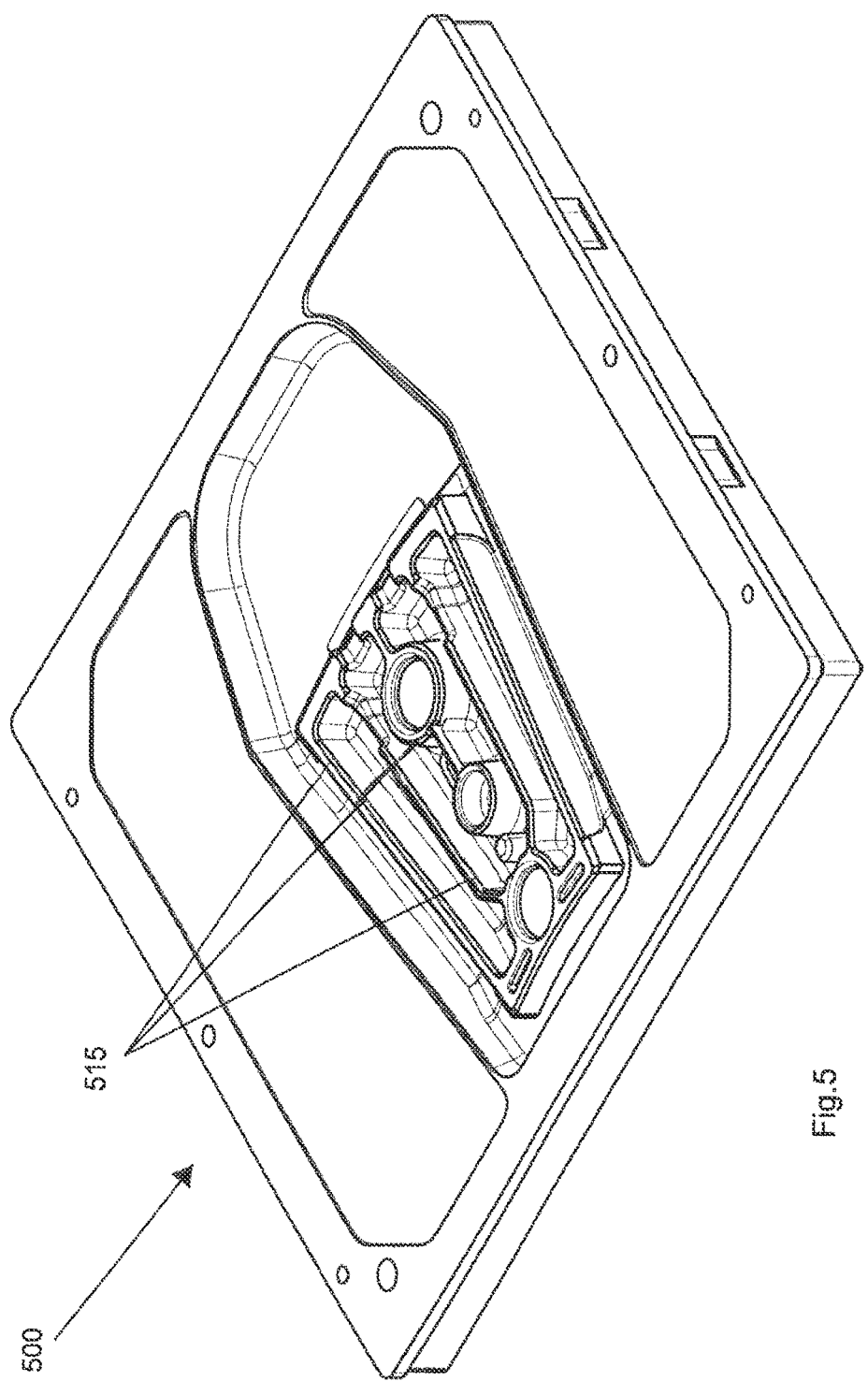
FIG. 5 depicts an exemplary casting mold for a refiner plate segment having rounded blunt surfaces at portions of the casting mold that can form outer junctions of the back side of the refiner plate segment.

FIG. 5 depicts an exemplary casting mold 500 in which blunt surfaces are chamfer blunt surfaces 515. In other exemplary embodiments, the blunt surfaces may be rounded blunt surfaces. The casting mold may be a positive mold of the final refiner plate segment. Sand or other such suitable material is generally poured into the casting mold 500 and sealed to form a sand mold (not pictured) that is a negative mold of the refiner plate segment. Molten metal is generally poured into this mold to create the cast refiner plate segment (see FIG. 4). The chamfer blunt surfaces 515 are at portions of the casting mold that would otherwise form a junction between machined metal surfaces on the refiner plate. These junctions may be formed by substantially orthogonal machined surfaces (see 210 and 220 of FIG. 2). In other exemplary embodiments, these junctions may be formed by machined surfaces that form acute or obtuse angles relative to adjacent machined surfaces.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A refiner plate segment configured to produce pulp by refining lignocellulosic material, the refiner plate segment comprising:
   a front side having a surface configured to refine the lignocellulosic material; and
   a back side having a cast blunt surface at a junction between a first machined surface and a second machined surface, wherein the first machined surface is substantially perpendicular to the second machined surface.

2. The refiner plate segment of claim 1, wherein the cast blunt surface is a cast chamfer surface.

3. The refiner plate segment of claim 2, wherein the cast blunt surface extends along a perimeter on the back side of the refiner plate segment and the first machined surface forms the perimeter on the back side of the refiner plate segment.

4. The refiner plate segment of claim 2, wherein the cast blunt surface is on a body junction, and wherein the first machined surface and the second machined surface are surfaces of a rib.

5. The refiner plate segment of claim 1, wherein the cast blunt surface is a cast rounded surface.

6. The refiner plate segment of claim 5, wherein the cast blunt surface is on an outer junction and wherein the first machined surface is at a perimeter of the refiner plate segment.

7. The refiner plate segment of claim 5, wherein the cast blunt surface is on a body junction and the first machined surface and the second machined surface are surfaces of a rib.

8. The refiner plate segment of claim 1, wherein the cast blunt surface is at least one of a cast chamfer surface and a cast rounded surface.

9. The refiner plate segment of claim 1, wherein the cast blunt surface is on a perimeter rib of the refiner plate segment and wherein the first machined surface and the second machined surface are surfaces of the perimeter rib.

* * * * *